(12) United States Patent
Turnbull et al.

(10) Patent No.: US 7,694,896 B2
(45) Date of Patent: Apr. 13, 2010

(54) LIQUID RESERVOIR, SPRAY ASSEMBLY, AND METHOD OF USING SAME

(75) Inventors: William N. Turnbull, Seattle, WA (US); Clifford W. Turnbull, Kent, WA (US)

(73) Assignee: Trade Associates, Inc., Kent, WA (US)

( * ) Notice: Subject to any disclaimer, the term of this patent is extended or adjusted under 35 U.S.C. 154(b) by 584 days.

(21) Appl. No.: 11/588,171

(22) Filed: Oct. 25, 2006

(65) Prior Publication Data

US 2007/0095932 A1 May 3, 2007

Related U.S. Application Data

(63) Continuation-in-part of application No. 11/261,936, filed on Oct. 28, 2005, now abandoned.

(51) Int. Cl.
*B05B 7/30* (2006.01)
*B05B 9/03* (2006.01)
*B05B 9/00* (2006.01)
*B05B 17/04* (2006.01)

(52) U.S. Cl. .................. 239/379; 239/11; 239/302; 239/340; 239/347; 239/600; 239/DIG. 14

(58) Field of Classification Search ............... 239/11, 239/302, 327, 328, 340, 345–348, 373, 379, 239/526, 600, DIG. 14
See application file for complete search history.

(56) References Cited

U.S. PATENT DOCUMENTS

| | | | |
|---|---|---|---|
| 1,703,384 A | 2/1929 | Birkenmaier | |
| 3,255,972 A | 6/1966 | Hultgren et al. | 239/318 |
| 4,405,088 A | 9/1983 | Gray | 239/302 |
| 4,444,332 A | 4/1984 | Widen et al. | 220/306 |
| 4,562,965 A | 1/1986 | Ihmels et al. | 239/346 |
| 4,824,018 A | 4/1989 | Shreve | 239/114 |
| 4,971,251 A | 11/1990 | Dobrick et al. | 239/346 |
| 5,213,264 A | 5/1993 | Styne | 239/309 |
| 6,053,429 A | 4/2000 | Chang | 239/345 |
| 6,092,740 A | 7/2000 | Liu | 239/346 |
| 6,435,426 B1 | 8/2002 | Copp, Jr. | 239/346 |
| 6,536,687 B1 | 3/2003 | Navis et al. | 239/345 |
| 6,595,441 B2 | 7/2003 | Petrie et al. | 239/345 |
| 6,698,670 B1 | 3/2004 | Gosis et al. | 239/376 |
| 6,712,292 B1 | 3/2004 | Gosis et al. | 239/345 |
| 6,820,824 B1 | 11/2004 | Joseph et al. | 239/346 |
| 6,938,836 B2 | 9/2005 | Bouic | 239/346 |

(Continued)

FOREIGN PATENT DOCUMENTS

TW          375974          12/1999

(Continued)

OTHER PUBLICATIONS

Lewis M. Gerson Co., Inc., U.S. Style Gerson Quick-Lock Paint System, Product Benefits and Features, 2005 Louis M. Gerson, Inc., 1 Page.

*Primary Examiner*—Darren W Gorman
(74) *Attorney, Agent, or Firm*—Dorsey & Whitney LLP

(57) ABSTRACT

Disposable reservoirs for use with spray apparatuses, reservoir-adapter kits, spray assemblies employing such reservoirs, and methods of use are disclosed.

16 Claims, 8 Drawing Sheets

U.S. PATENT DOCUMENTS

| | | | |
|---|---|---|---|
| 6,942,126 B2 | 9/2005 | Douglas et al. | 222/386.5 |
| 6,945,429 B2 | 9/2005 | Gosis et al. | 222/105 |
| 7,143,960 B2 | 12/2006 | Joseph et al. | 239/379 |
| 2003/0025002 A1 | 2/2003 | Hughes | 239/340 |
| 2003/0209573 A1 | 11/2003 | Bouic | 222/541.1 |
| 2004/0140373 A1 | 7/2004 | Joseph et al. | 239/379 |
| 2004/0251269 A1* | 12/2004 | Gosis et al. | 222/1 |
| 2006/0000927 A1* | 1/2006 | Ruda | 239/345 |
| 2006/0113409 A1* | 6/2006 | Camilleri et al. | 239/600 |
| 2006/0157584 A1 | 7/2006 | Nomiyama et al. | 239/302 |
| 2007/0095943 A1 | 5/2007 | Turnbull et al. | 239/345 |
| 2008/0237370 A1 | 10/2008 | Turnbull et al. | 239/337 |

FOREIGN PATENT DOCUMENTS

| | | |
|---|---|---|
| TW | 388397 | 4/2000 |
| TW | 409717 | 10/2000 |
| TW | 469874 | 12/2001 |
| TW | 265120 | 5/2005 |

* cited by examiner

LIQUID RESERVOIR, SPRAY ASSEMBLY, AND METHOD OF USING SAME

CROSS-REFERENCE TO RELATED APPLICATION

This application is a continuation-in-part application of application Ser. No. 11/261,936, filed Oct. 28, 2005, the disclosure of which is incorporated herein by reference.

TECHNICAL FIELD

This invention relates to disposable reservoirs for holding liquids, and spray assemblies and methods employing such reservoirs.

BACKGROUND OF THE INVENTION

A wide variety of spray apparatuses for applying liquids, such as paint, varnish, cleaning solvents, or other liquid materials to a surface are known. Typically, such spray apparatuses include a reservoir containing the liquid and a spray apparatus configured to spray the liquid in the reservoir. The liquid from the reservoir may be gravity fed or pressure fed to the spray apparatus by an air bleed from the compressed air line to the reservoir.

One conventional reservoir is a rigid pot attached to the spray gun apparatus with a removable lid. The reservoir is re-usable and should be thoroughly cleaned when changing the liquid in the reservoir in order to prevent contaminating the new liquid that is poured into the reservoir. However, cleaning the reservoir and, if needed, the spray gun apparatus is time consuming and may require the use of solvents that are costly and may be a health hazard to the operator.

Another conventional reservoir employs a collapsible liner that is placed within a rigid reservoir. During use, the liquid is withdrawn from the collapsible liner and, after spraying, the collapsed liner and lid can be removed and thrown away allowing a new, clean liner and lid to be used for applying a different liquid. While the collapsible liner is useful because the rigid reservoir does not have to be cleaned as often, it can be difficult to install and remove the liner within the rigid reservoir. Furthermore, sometimes not all of the paint in the liner is used, and this un-used paint can be difficult to recover from the liner.

Therefore, there is a need in the art for a more user friendly disposable reservoir. It would also be desirable that such a reservoir be cheap to fabricate and transport, and suitable for use with a variety of conventional spray gun apparatuses.

SUMMARY OF THE INVENTION

The invention is directed to disposable reservoirs for use with spray apparatuses, reservoir-adapter kits, spray assemblies employing such reservoirs, and methods of use. In one aspect of the invention, a reservoir includes a body including a first end portion having an outlet, a second end portion having an inlet, and a passageway extending between the inlet and the outlet. The first end portion includes threads configured to be threadly coupled to a threaded coupling member of a spray apparatus. A lid may be removably attached to the second end portion to cover the inlet. The lid has a vent formed therein communicating with the passageway when attached to the body.

In one embodiment, the first portion of the body includes interior threads disposed within the passageway and a wall extending about the vent formed in the cover to define a plug receiving volume. The wall has interior threads configured to be threadly coupled to the exterior threads of a plug. In such an embodiment, a plug may be threadly coupled to the interior threads to cover the vent and another plug may be threadly coupled to interior threads of the first end portion to enable mixing liquids, such as paint, within the reservoir and storing paint within the reservoir.

Another aspect of the invention is directed to a spray assembly in which the reservoir may be coupled to a spray apparatus to provide paint thereto. Other aspects are directed to methods of using the reservoirs disclosed herein.

DETAILED DESCRIPTION OF THE EMBODIMENTS

The invention is directed to disposable reservoirs for use with spray apparatuses, reservoir-adapter kits, spray assemblies employing such reservoirs, and methods of use. Many specific details of certain embodiments of the invention are set forth in the following description and in FIGS. 1 through 6 in order to provide a thorough understanding of such embodiments. One skilled in the art, however, will understand that the invention may have additional embodiments, or that the invention may be practiced without several of the details described in the following description.

Figure 1:
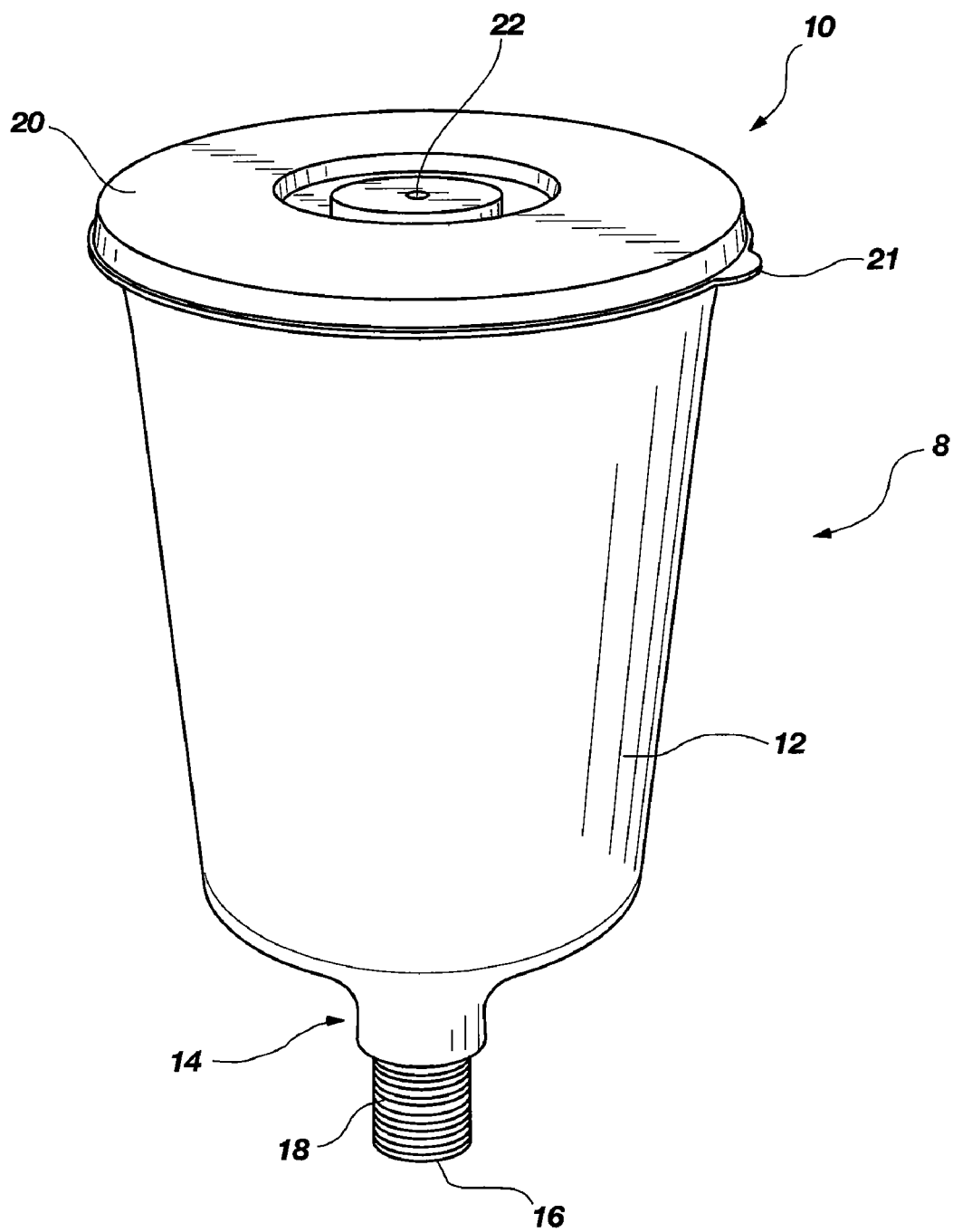
FIG. 1 is an isometric view of a liquid reservoir having external threads for use with a spray apparatus according to one embodiment of the invention.
Figure 2A:
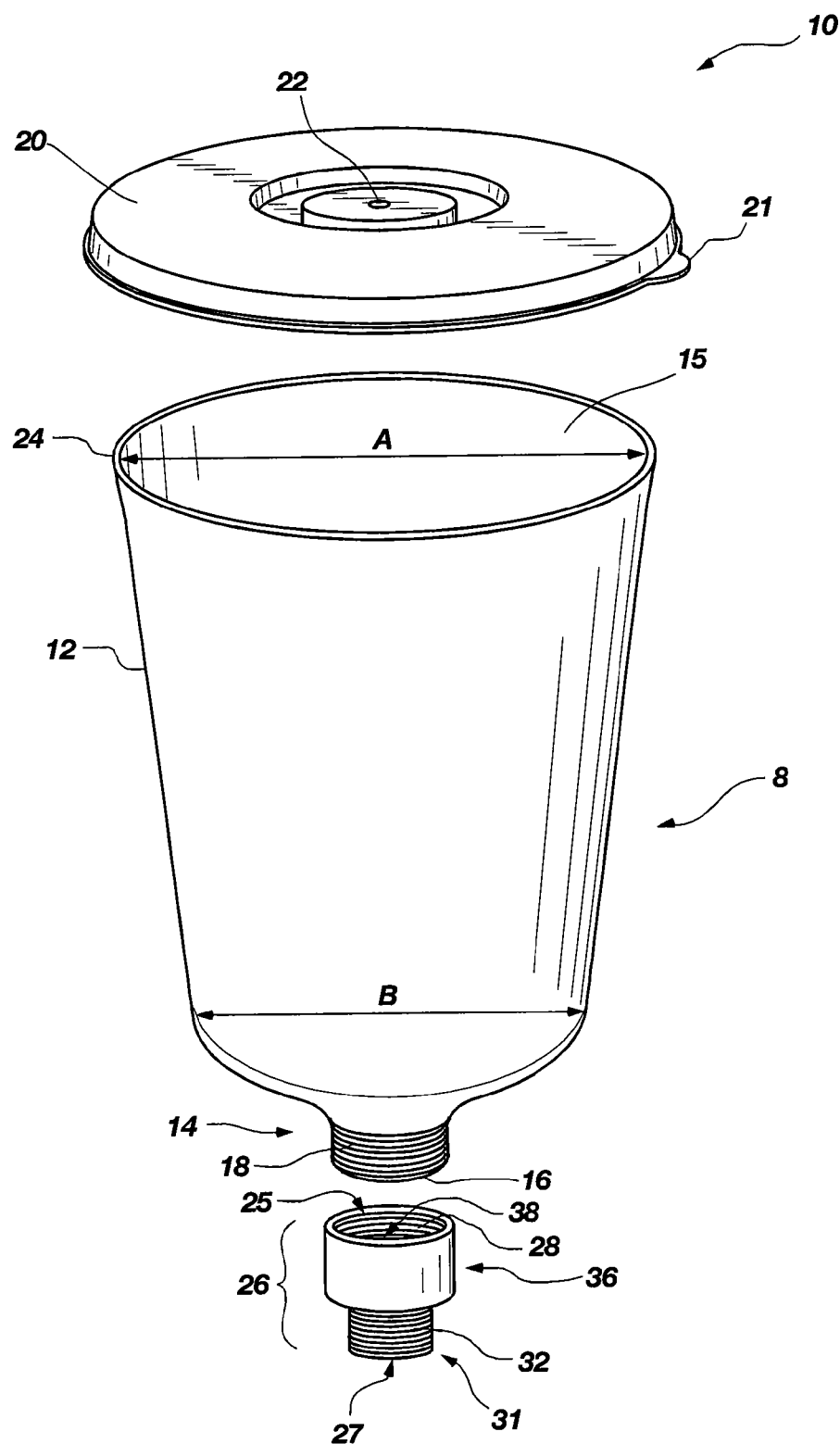
FIG. 2A is a schematic exploded view of the liquid reservoir of FIG. 1 that additionally depicts an adapter that threadly attaches to the reservoir for use with a spray apparatus according to one embodiment of the invention.
Figure 2B:
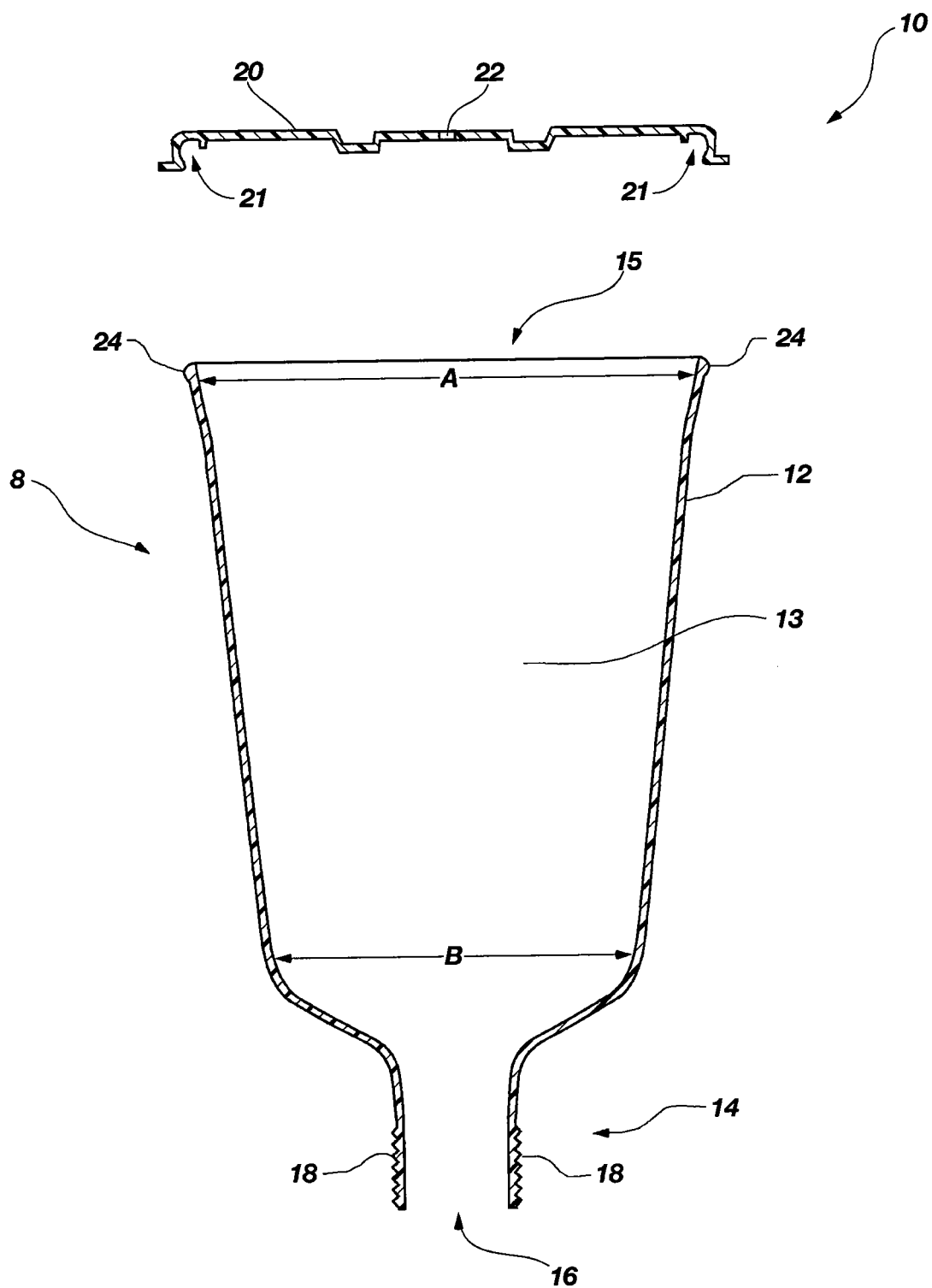
FIG. 2B is an exploded schematic sectional view of the reservoir of FIG. 1.

FIGS. 1 and 2A-B show a liquid reservoir 10 for containing paint or another liquid according to one embodiment of the invention. The reservoir 10 includes a body 8 having a main section 12 and a neck section 14, both of which may have, for example, a wall thickness of approximately 0.001 inches. The main section 12, neck section 14, or both may be formed to have a generally cylindrical shape, however, other shapes may also be used depending upon the particular manufacturing process employed. As shown in FIGS. 2A and 2B, the main section 12 also includes an inlet 15 in which paint or another liquid may be poured through, an outlet 16 in which the paint exits to a spray apparatus, and a passageway or hollow 13 extending between the inlet 15 and the outlet 16 defined by the body 8 for holding a volume of liquid. The neck section 14 includes exterior threads 18 formed on the exterior thereof that are configured to threadly engage an adapter 26 and/or the interior threads of a threaded coupling member of a spray apparatus (not shown). The main section 12, neck section 14, and exterior threads 18 may be formed as a unitary structure. By integrally forming the main section 12, neck section 14, and exterior threads 18 as a unitary structure, the manufacturing cost of the liquid reservoir 10 can be minimized because it can be manufactured by such inexpensive techniques as injection molding various polymer materials. An upper portion of the main section 12 may have an inner diameter A that is larger than an inner diameter B of a lower portion of the main section 12, and the inner diameter of the main section 12 may continuously taper from the inlet toward the neck section 14 to enable easily nesting one body 8 within another. This allows one body 8 to fit into another body 8 so that the multiple bodies 8 may be nested together to conserve space during packaging and shipping. The shipping costs can be a significant part of the manufactured cost of the liquid reservoir 10. In fact, while the liquid reservoir 10 may be inexpensively manufactured in countries a large distance from the United States, the shipping costs can make manufacture in such countries economically impractical. However, the ability to inexpensively manufacture and ship the liquid reservoir 10 to consumer markets makes it economically feasible for the reservoir 10 to be disposable after use. This disposability of the liquid reservoir 10 is a highly desirable feature of the reservoir because of the nature of paints and other fluids that will be placed in the reservoir 10. Although the main section 12 as shown in FIGS. 1 and 2A-B tapers in a linear manner, it may also taper in another manner. However, regardless of the configuration of the tapering, the inner diameter of the main section 12 preferably decreases continuously to facilitate nesting of the main section 12.

The reservoir 10 further includes a removable lid 20 configured to tightly snap fit onto the end of the main section 12 proximate the inlet 15. The lid 20 may be relatively thin-walled and it may be inexpensively manufactured using injection molding or other conventional techniques. Again, the relatively small manufactured cost of the lid 20 helps make it economically feasible for the liquid reservoir 10 to be disposable. In one embodiment, the lid 20 includes a recess 21 sized to receive a lip 24 of the main section 12. The lid 20 snap fits onto the main section 12 due to an interference fit with the lip 24. The sealing engagement of the lid 20 onto the main section 12 should be sufficient to prevent paint from leaking out of the edge of the main section 12 during use. The lid 20 also has a vent 22 extending through its thickness. The vent 22 enables the pressure within the passageway or hollow 13 of the body 8 to equalize to ambient pressure and prevent a vacuum from forming during operation when paint is drawn out of the reservoir 10 through the outlet 16. If desired, to assist the user with installation and removal of the lid 20, the lid 20 may include a tab 21 integrally formed therewith.

With reference to FIG. 2A, one embodiment of a suitable adapter is shown as adapter 26. An adapter may be used, if the neck section 14 and the threads 18 thereof are not suitably configured to be coupled to a desired spray apparatus because the spray apparatus has a thread coupling member that is sized differently or has exterior threads. In one case, the adaptor may include a spray apparatus coupling portion having interior threads that are sized and configured to couple with exterior threads of a threaded coupling member of a spray apparatus. The adaptor 26 includes an inlet 25, an outlet 27, and a passageway 38 that extends therebetween for fluidly communicating liquid from the reservoir 10 to a spray apparatus. The adaptor 26 includes a reservoir coupling portion 36 having interior threads 28 configured to threadly engage the exterior threads 18 on the reservoir 10. The adaptor 26 further includes a spray apparatus coupling portion 31 having internal threads 32 sized and configured for coupling to exterior threads of a threaded coupling member of a spray apparatus. In another embodiment, the spray apparatus coupling portion 31 may have a diameter that is smaller or greater than the diameter of the neck section 14 and the threads 32 may be external threads in order to couple the reservoir 10 to a spray apparatus with a thread coupling member of a different size.

Figure 3A:
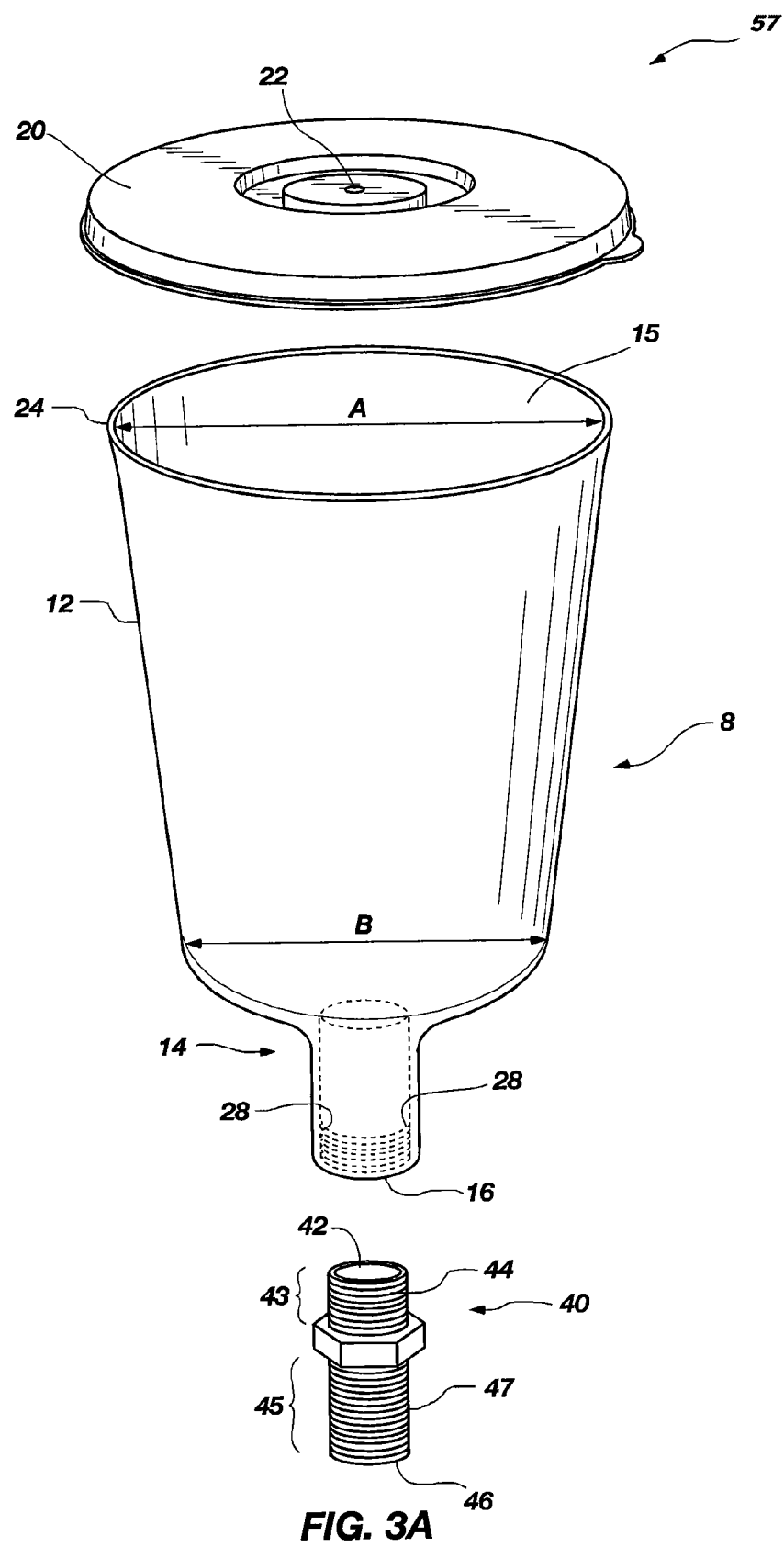
FIG. 3A is a schematic exploded view of a liquid reservoir and an associated adapter that threadly attaches to internal threads of the reservoir for use with a spray apparatus according to one embodiment of the invention.
Figure 3B:
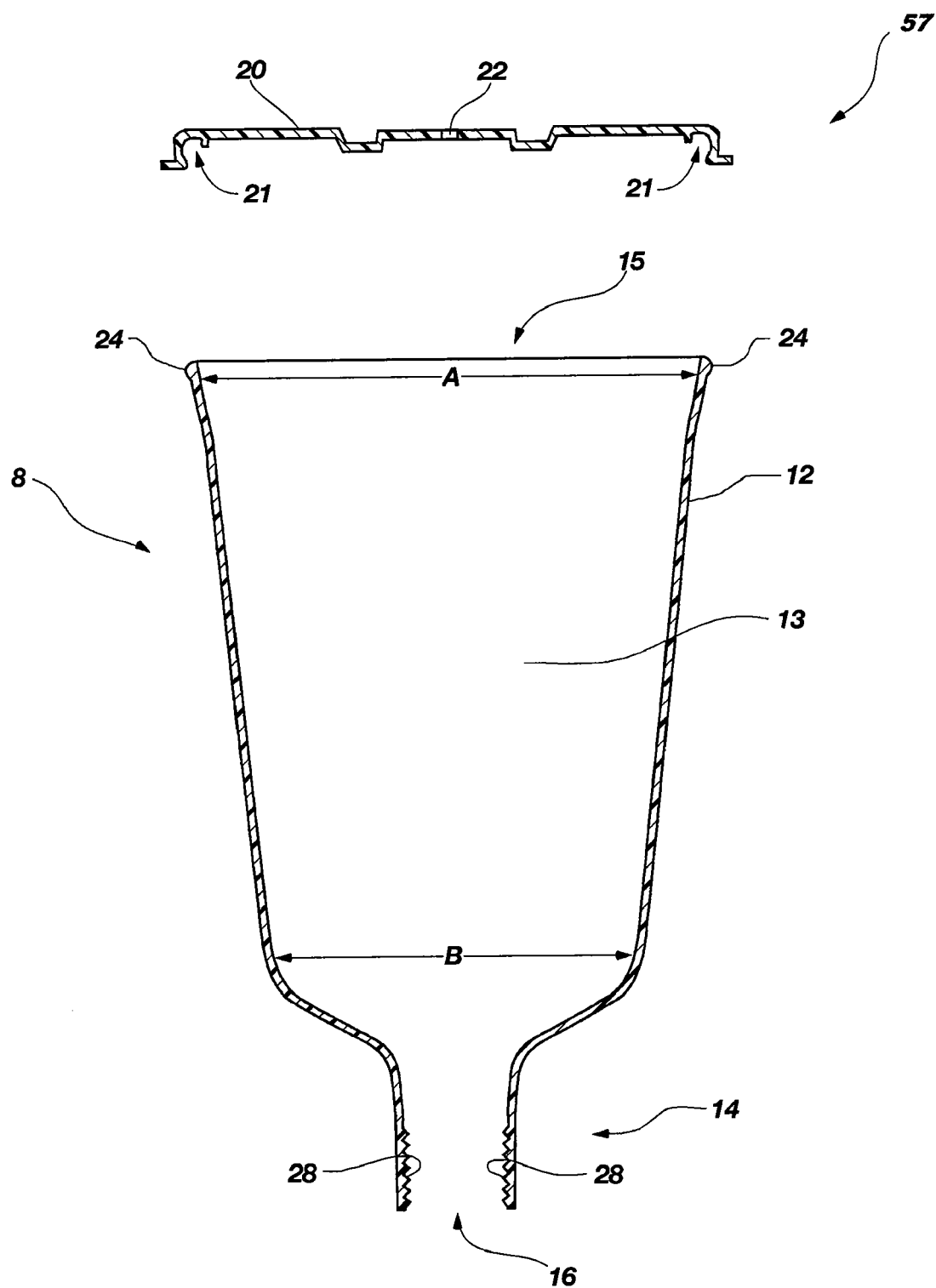
FIG. 3B is an exploded schematic sectional view of the reservoir of FIG. 3A.

FIGS. 3A-3B show a reservoir 57 according to another embodiment of the invention. The reservoir 57 has many of the same components that are included in the reservoir 10 of FIGS. 1 and 2A-2B. Therefore, in the interest of brevity, the components of the reservoirs 10 and 57 that correspond to each other have been provided with the same reference numerals, and an explanation of their structure and function will not be repeated. In the reservoir 57, threads 28 are formed on an interior of the neck section 14 and, thus, are disposed within the passageway 13. Such an embodiment is compatible with many conventional spray gun apparatuses, which have a threaded coupling member with external threads. Thus, the reservoir 57 does need an adapter in order to be coupled to the threaded coupling device of most conventional spray gun apparatus.

However, if it is desirable to use the reservoir 57 with a spray apparatus having a coupling member with internal threads, an adapter may be used. One embodiment of a suitable adapter is shown in FIGS. 3A-3B as adapter 40 for coupling the reservoir 57 to a spray apparatus having a thread coupling member with internal threads. The adapter 40 includes an inlet 42, an outlet 46, and a passageway therebetween for fluidly communicating a flow of liquid to the spray apparatus from the reservoir 57. The adapter 40 includes a reservoir coupling portion 43 having external threads 44 that are sized and configured to be inserted into the inlet 16 of the reservoir 57 and threadly engage the interior threads 28. The adaptor 40 also includes a spray apparatus coupling portion 45 having external threads 47 configured to connect to internal threads of a coupling member of a spray apparatus (not shown). In another embodiment, the spray apparatus coupling portion 45 may have a diameter that is smaller or greater than the inner diameter of the neck section 14 and/or the threads 47 may be internal threads disposed within the passageway of the adapter 40 in order to couple the reservoir 57 to a spray apparatus with a threaded coupling member of a different size and/or configuration.

Figure 4:
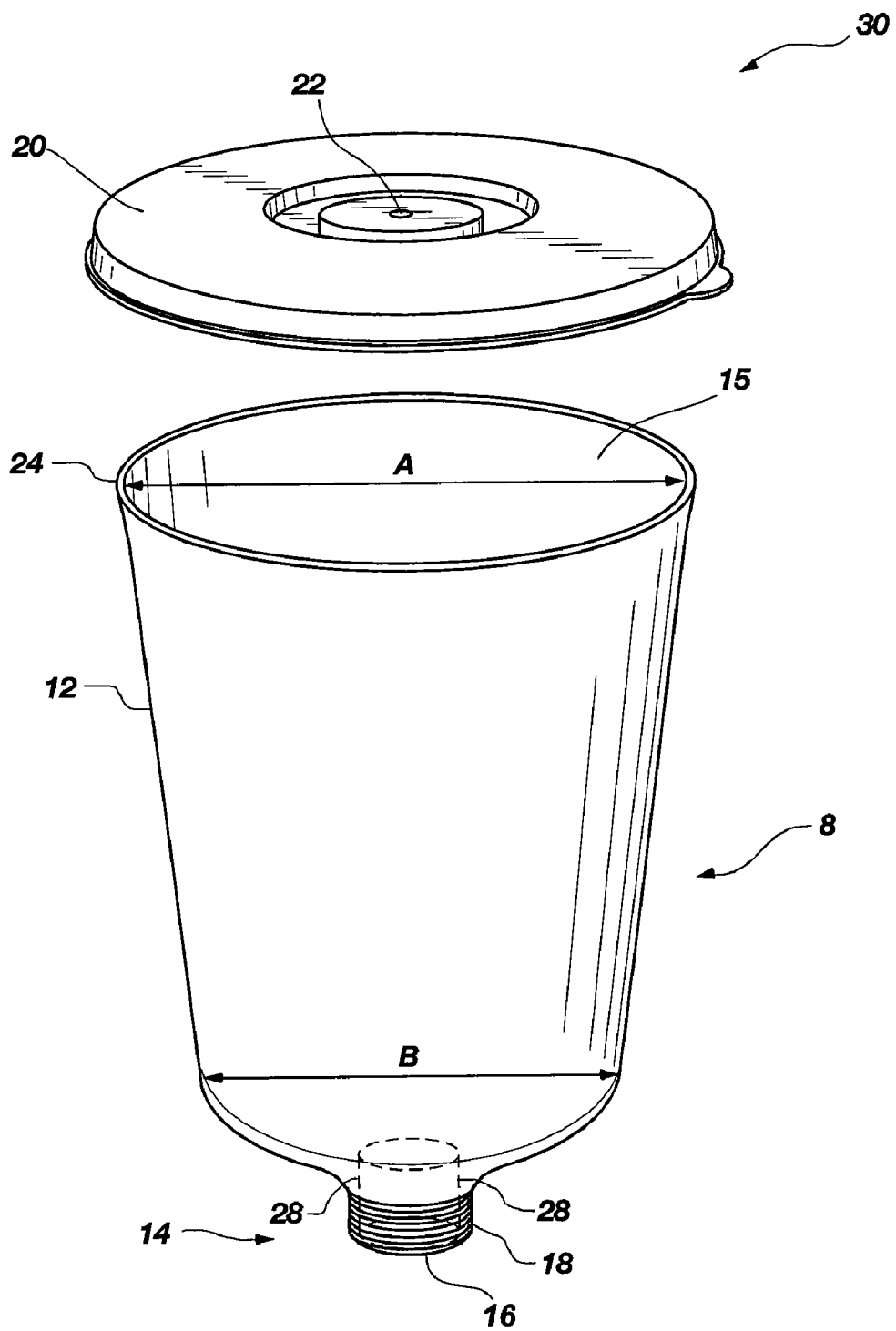
FIG. 4 is a schematic exploded view of a liquid reservoir that has both internal and external threads for use with a spray apparatus according to yet another embodiment of the invention.

FIG. 4 shows a reservoir 30 according to yet another embodiment of the invention. The reservoir 30 has many of the same components that are included in the reservoir 10 of FIGS. 1 and 2A-2B. Therefore, in the interest of brevity, the components of the reservoirs 10 and 30 that correspond to each other have been provided with the same reference numerals, and an explanation of their structure and function will not be repeated. The reservoir 30 includes the exterior threads 18 formed on the exterior of the neck section 14 and interior threads 28 disposed on the interior of the neck section 14. Accordingly, such an embodiment may be used with an adapter for use with a spray apparatus that has internal or external threads on a coupling member. For example, the adapters 26 and 40 may be employed with the reservoir 30. Providing both interior and exterior threads 28 and 30 enables the reservoirs 26 and 30 to be connected to a variety of different types of paint spray apparatuses and components.

Figure 5:
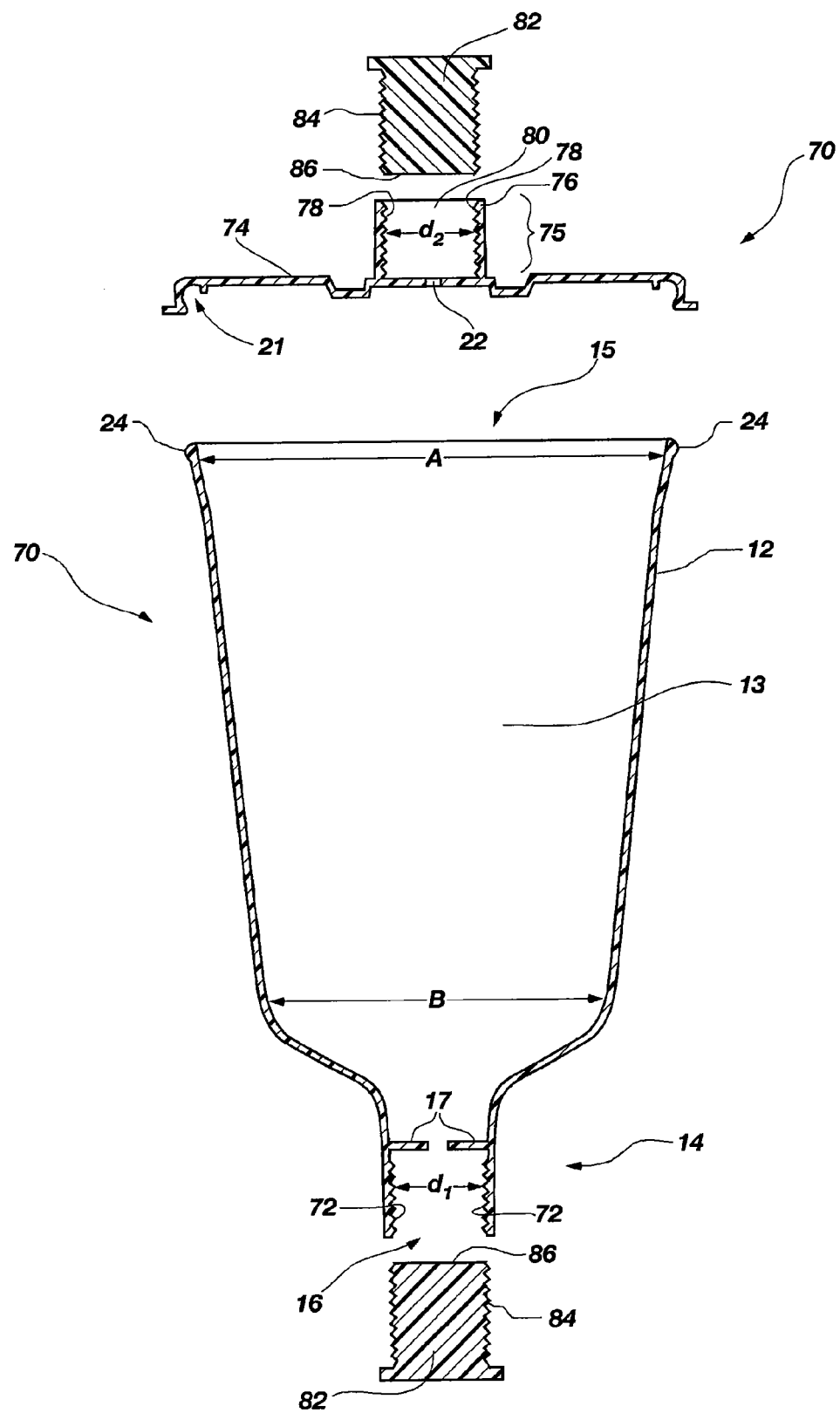
FIG. 5 is an exploded schematic sectional view of a reservoir according to yet another embodiment.

FIG. 5 shows a schematic side sectional view of a reservoir 70 according to yet another embodiment of the invention. The reservoir 70 has many of the same components that are included in the reservoir 10 of FIGS. 1 and 2A-2B. Therefore, in the interest of brevity, the components of the reservoirs 10 and 70 that correspond to each other have been provided with the same reference numerals, and an explanation of their structure and function will not be repeated. The neck section 14 of the reservoir 70 has a diameter $d_1$ and includes internal threads 72 formed on interior thereof thereby allowing the body 70 to be threadly coupled to external threads of a threaded coupling member of a spray apparatus. The reservoir 70 further includes a removable lid 74 configured to tightly fit onto the end of the main section 12 proximate the inlet 15. The lid 74 includes a vent 22 that enables the pressure within the passageway or hollow 13 of the body 70 to equalize to ambient pressure. The lid 74 further includes an integrally formed plug receiving portion 75 having a wall 76 extending about the vent 22. The wall 76 defines a plug receiving space 80 having a diameter $d_2$. The wall 76 also has interior threads 78 formed on the interior thereof. The diameter $d_1$ and $d_2$ may be substantially equal so that a plug 82 with exterior threads 84 may be threaded into the plug receiving portion 75 to threadly engage the interior threads 78 thereof and another plug 82 with the same or similar configuration may be threaded into the neck section 14 so that the exterior threads 84 thereof threadly engage the interior threads 72 of the neck section 14. The plug 82 may be threaded into the neck section 14 deep enough until an end 86 thereof abuts portion 17 that extends radially inwardly into the portion of the passageway 13 in the neck section 14. The plug 82 may be threaded into the plug receiving space 80 deep enough so that the end 86 abuts the vent 22 of the lid 74 thereby sealing the vent 22. With one of the plugs 82 threaded into the neck section 14 and another one of the plugs 82 threaded into the plug receiving portion 75, the reservoir 70 is substantially sealed and may be used to mix and store paint or other liquids.

The reservoirs 10, 57, 30, and 70 including the body 8 and lid 20 thereof may be formed from a variety of commercially available materials. In some embodiments, the body 8 may be formed of polymeric materials such as, polypropylene, polyethylene, or another suitable material that is compatible with paint and/or paint thinners. In one embodiment, the body is formed from high density polyethylene and the lid 20 is formed of low density polyethylene. The body 8 may be fabricated using injection molding and blow molding using any of the aforementioned polymeric materials. Such fabrication techniques are suitable for forming the main section 12, neck section 14, and threads on the neck section 14 as a unitary polymeric structure. As explained above, integrally forming the reservoirs 10, 57, 30 and 70 as unitary structures allows them to be inexpensively manufactured by injection molding and thus readily disposable. Injection molding is well suited for forming internal threads 28 of the reservoir 57 and blow molding is well suited for forming the external threads 18 of the reservoir 10. The adapter 26 and 40 may also be formed from the same or similar materials using injection molding or another suitable process. Accordingly, the above materials and processes enable forming a reservoir having integrally formed threads that is cheap enough to be disposed by the user after use.

Additional embodiments are directed to a kit. The kit may contain one or more of the aforementioned liquid reservoirs along with their associated lids, and one or more compatible adapters, such as any of the aforementioned adapters. For example, the kit may include a combination of any of the aforementioned reservoirs and a combination of any of the aforementioned adapters that are compatible with the reservoirs. The kit may also include instructions for use and/or information about which commercially available spray apparatuses are compatible with which adapters and reservoirs. In one embodiment, a plurality of reservoirs may be nested within each other to reduce the overall size of the kit when packaged.

Figure 6:
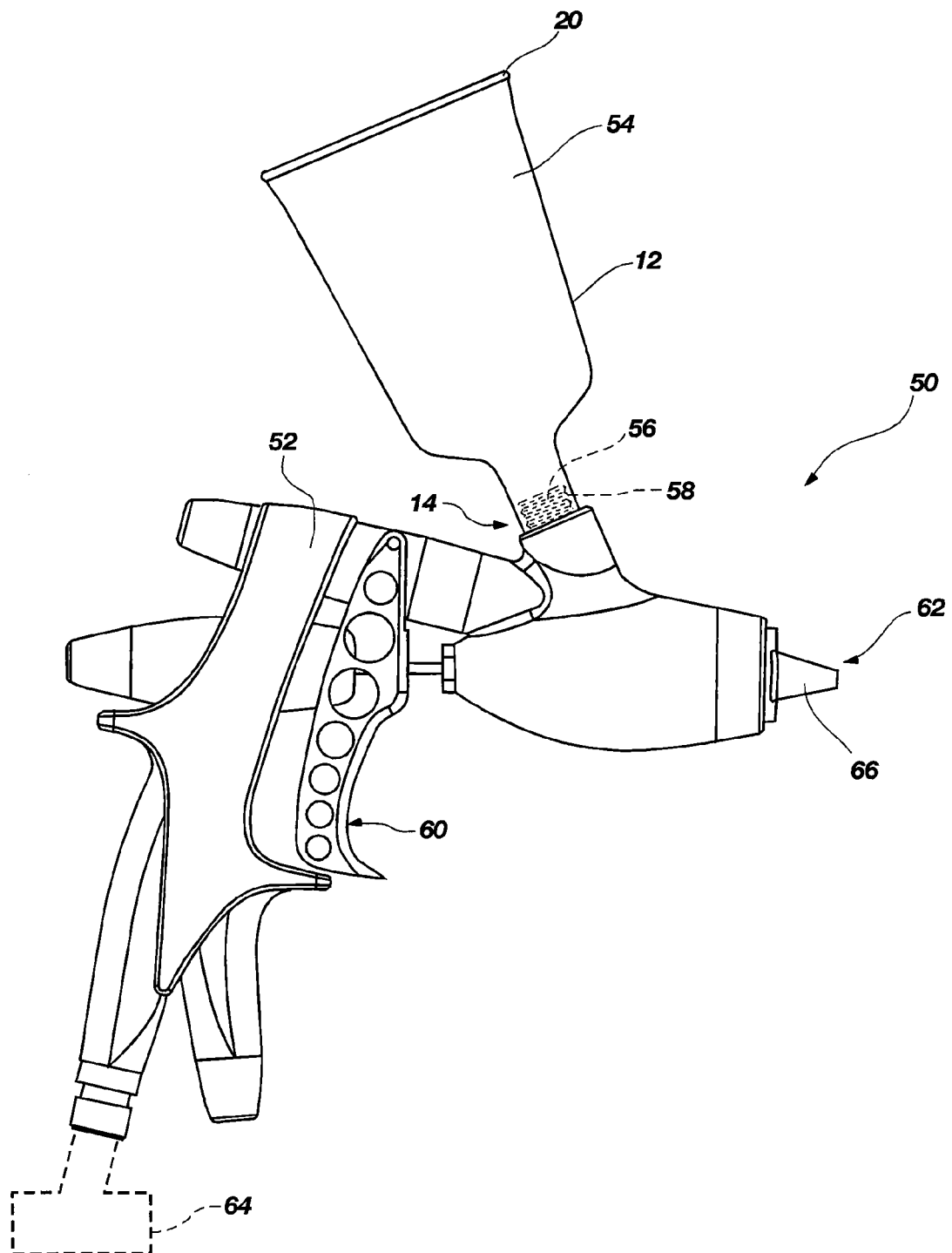
FIG. 6 is a schematic view of the liquid reservoir according to FIG. 3A and an associated spray gun apparatus according to one embodiment of the invention.

FIG. 6 shows a schematic side elevation view of a spray assembly 50 according to one embodiment of the invention that may employ any of the aforementioned embodiments of reservoirs and adapters. The spray assembly 50 includes a spray gun apparatus 52 having a reservoir 54 that threadly attaches to a threaded coupling member 56 of the spray gun apparatus 52. As depicted in FIG. 5, in one embodiment, the reservoir 54 has internal threads that are threadly coupled to external threads 58 of the threaded coupling member 56. In other embodiments, the reservoir 54 may have external threads and an adapter having internal threads that may be threadly coupled to external threads 58 of the threaded coupling member 56. The reservoir 10 and adapter 26 show such an embodiment. Similarly, in another embodiment, the threaded coupling member 56 may have internal threads and the reservoir 54 may also have internal threads. In such a case, an adapter such as the adapter 40 shown in FIGS. 3A-3B may be used to couple the reservoir to the spray gun apparatus 52.

Upon the user manually pulling a trigger 60, the paint or other liquid is gravity fed from the reservoir 54 through a passageway (not shown), which may be formed in the thread coupling member 56 or in another component, to fluidly communicate the paint with a nozzle 62 of the spray gun apparatus 52. A compressed air source 64 also delivers compressed air to the spray gun apparatus 52 that is emitted from an air cap 66 that mixes externally with the paint to atomize the paint. One of ordinary skill in the art will recognize that the various embodiments for the reservoirs and adapters may be used with other spray gun apparatuses. The spray gun apparatus 52 shown in FIG. 6 is merely one type of spray gun apparatus that may be employed.

In a method according to one embodiment, the user attaches the reservoir 54 to the spray gun apparatus 52. If necessary, the user may first couple an adapter to the thread coupling member 56 or, alternatively, first to the reservoir 54. Then, the user fills the reservoir 54 with the desired amount and type of paint and/or paint thinner, and closes the reservoir 54 with the lid 20. The user sprays the paint in the reservoir 54 onto a surface. When the user is finished, the user may decouple the reservoir 54 from the spray gun apparatus 52. Any un-used paint may be poured into another container and the reservoir 54 may be disposed of or thrown away. Another reservoir 54 may then be attached to the spray gun apparatus 52 and the process repeated using the same or a different type of paint and/or paint thinner.

In a method according to another embodiment suitable for use with the aforementioned reservoir 70 described in FIG. 5, the user threads a plug 82 into the neck section 14 of the body 70 to obstruct the outlet 16 thereof. Paint, different paints (e.g., paints of different colors), or paint constituents, such as paint thinner, may be poured into the body 70 through the inlet 15. The constituents poured into the body 70 may be stirred in the body 70. After stirring, the user attaches the lid 74 to the body 70 with another plug 82 threaded into the plug receiving portion 75. The plug 82 may be threaded into the plug receiving portion 75 before or after attaching the lid 74 to the body 70. In such a configuration, the paint may be stored in the reservoir 70 because the plugs 82 prevent paint from leaking out of the outlet 16 of the body 70 and the vent 22 formed in the cover 74. When desired by the user, the reservoir 70 may be inverted and the plug 82 threaded into the neck section 14 may be removed. Next, the neck section 14 may be coupled to the external threads 58 of the threaded coupling member 56 of the spray gun apparatus 52. Finally, the plug 82 threaded into the plug receiving portion 75 may be removed so that the vent 22 is no longer obstructed and the spray apparatus 52 may be used.

Although the invention has been described with reference to the disclosed embodiments, persons skilled in the art will recognize that changes may be made in form and detail without departing from the spirit and scope of the invention. For example, the gravity feed spray gun apparatus 52 is one example of a commercially available spray gun that may be used with the adapters and reservoirs disclosed herein. Such modifications are well within the skill of those ordinarily skilled in the art. Accordingly, the invention is not limited except as by the appended claims.

What is claimed is:

1. A reservoir for use with a spray apparatus, comprising:
a body including a first end portion having an outlet, a second end portion having an inlet, and a passageway extending between the inlet and the outlet, the first end portion including interior threads disposed within the passageway configured to be threadly coupled to a threaded coupling member of the spray apparatus and exterior threads of a plug, the first end portion including a radially extending inward portion in the passageway; and
a lid removably attachable to the second portion to cover the inlet, the lid having a vent therein communicating with the passageway when attached to the body and a wall extending about the vent defining a plug receiving space, the wall having interior threads sized and configured to be threadly coupled to the exterior threads of the plug, the threads of the passageway and the threads of the plug being configured to allow at least a portion of an end of the plug to abut the radially extending inward portion of the passageway when the exterior threads of the plug are threadly coupled to the interior threads of the first end portion of the passageway.

2. The reservoir of claim 1 wherein the entire body is integrally formed as a unitary structure.

3. The reservoir of claim 2 wherein the interior threads of the first end portion of the body are integrally formed with the body.

4. The reservoir of claim 1 wherein the body comprises a main section that includes the inlet and a lip extending peripherally about the inlet.

5. The reservoir of claim 1 wherein the body includes a main section having an inner diameter that continuously decreases away from the inlet.

6. The reservoir of claim 5 wherein the inner diameter of the main section decreases away from the inlet in a linear manner.

7. The reservoir of claim 1 wherein the wall comprises an integrally formed wall.

8. The reservoir of claim 1 wherein the wall encircles the vent formed in the lid.

9. The reservoir of claim 1 wherein the interior threads disposed within the passageway are integrally formed with the body from a polymeric material and wherein the wall is an integrally formed part of the lid made from a polymeric material.

10. A method of using a reservoir having a first end portion having an outlet and a second end portion having an inlet, and a passageway extending between the inlet and the outlet, comprising:
threadly coupling a first plug to interior threads of the first end portion of the reservoir to obstruct the outlet of the reservoir, an end of the first plug abutting an inward extending radial portion positioned on an inner surface of the first end portion of the reservoir;
pouring one or more liquids through the inlet of the reservoir and into the passageway of the reservoir;
attaching a lid to the second end portion after the act of pouring one or more liquids; and
threadly coupling a second plug to interior threads of a plug receiving portion on the lid to obstruct a vent formed in the lid, an end of the second plug abutting an outer surface of the lid.

11. The method of claim 10, further comprising stirring the one or more liquids before the act of attaching the lid to the second end portion.

12. The method of claim 10, further comprising:
removing the first plug from the reservoir;
coupling the reservoir and a threaded coupling portion of a spray apparatus to each other;
removing the second plug from the lid; and
spraying the one or more liquids disposed within the reservoir onto a surface using the spray apparatus.

13. The method of claim 12 wherein:
the threaded coupling portion of the spray apparatus comprises external threads; and
the act of coupling the reservoir and a threaded coupling portion of the spray apparatus to each other comprises coupling the interior threads of the first end portion of the reservoir to the external threads of the spray apparatus.

14. The method of claim 10 wherein the act of threadly coupling a second plug to the interior threads of the plug receiving portion to obstruct the vent formed in the cover occurs prior to the act of attaching the lid to the second end portion.

15. The method of claim 10 wherein the one or more liquids comprises one or more paints.

16. The reservoir of the claim 1 wherein the threads of the wall of the vent and the threads of the plug are configured to allow at least a portion of the end of the plug to abut an outer surface of the lid when the exterior threads of the plug are threadly coupled to the interior threads of the wall of the vent.

* * * * *

UNITED STATES PATENT AND TRADEMARK OFFICE
CERTIFICATE OF CORRECTION

PATENT NO. : 7,694,896 B2  Page 1 of 1
APPLICATION NO. : 11/588171
DATED : April 13, 2010
INVENTOR(S) : William N. Turnbull and Clifford W. Turnbull It is certified that error appears in the above-identified patent and that said Letters Patent is hereby corrected as shown below:

| Column, Lines | Reads | Should Read |
|---|---|---|
| Column 4, Line 22 | "reservoir 57 does need" | --reservoir 57 does not need-- |
| Column 4, Line 24 | "spray gun appartus." | --spray gun apparatuses.-- |
| Column 4, Line 61 | "threads 28 and 30" | --threads 28 and 18-- |
| Column 4, Line 62 | "reservoirs 26 and 30" | --reservoir 10 and 30-- |
| Column 5, Line 57 | "by the user after use." | --of by the user after use.-- |

Signed and Sealed this

Tenth Day of August, 2010

David J. Kappos
*Director of the United States Patent and Trademark Office*